United States Patent [19]

Hrubes

[11] Patent Number: 5,302,894
[45] Date of Patent: Apr. 12, 1994

[54] NONCONTACTING DISPLACEMENT MEASURING SYSTEM HAVING AN ELECTRIC FIELD SHIELD

[75] Inventor: Franz Hrubes, Rottalmünster, Fed. Rep. of Germany

[73] Assignee: Micro-Epsilon Messtechnik GmbH & Co. KG, Ortenburg, Fed. Rep. of Germany

[21] Appl. No.: 768,540

[22] PCT Filed: Feb. 12, 1990

[86] PCT No.: PCT/DE90/00090
§ 371 Date: Sep. 30, 1991
§ 102(e) Date: Sep. 30, 1991

[87] PCT Pub. No.: WO90/12274
PCT Pub. Date: Oct. 18, 1990

[30] Foreign Application Priority Data

Mar. 30, 1989 [DE] Fed. Rep. of Germany ....... 3910297

[51] Int. Cl.$^5$ ..................... G01B 7/14; G01N 27/90
[52] U.S. Cl. ..................... 324/207.16; 324/207.12; 324/207.15
[58] Field of Search ............. 324/207.16, 225, 207.12, 324/207.15, 236, 260–262; 336/84 C

[56] References Cited

U.S. PATENT DOCUMENTS

| | | | |
|---|---|---|---|
| 4,042,876 | 8/1977 | Visioli, Jr. | 324/207.16 |
| 4,053,826 | 10/1977 | Wasawa et al. | 324/207.16 |
| 4,678,994 | 7/1987 | Davies | 324/207.16 X |
| 4,956,606 | 9/1990 | Kwiatkowski et al. | 324/207.16 X |
| 5,036,274 | 7/1991 | Seeburger | 324/207.16 |
| 5,068,607 | 11/1991 | Redlich | 324/207.16 |

FOREIGN PATENT DOCUMENTS 1900894 12/1976 Fed. Rep. of Germany.
3801828 8/1988 Fed. Rep. of Germany.

*Primary Examiner*—Kenneth A. Wieder
*Assistant Examiner*—Warren S. Edmonds
*Attorney, Agent, or Firm*—Bell, Seltzer, Park & Gibson

[57] ABSTRACT

A noncontacting displacement measuring system therefor a sensor (2) with a housing (11), at least one coil (1) accommodated in the sensor housing (11) and an embedding substance (13) for anchoring the coil (1), and further therefor an electronic supply/evaluation unit, is designed such that the influence of fluids and solids with a high dielectric constant on the measured values is large eliminated. To this end, a shield (15) is provided on the measuring side (8) of the sensor (2), which is at least largely impervious to electric field lines (9) emanating from the coil (1), but largely permeable to electromagnetic field lines emanating from the coil (1).

13 Claims, 2 Drawing Sheets

NONCONTACTING DISPLACEMENT MEASURING SYSTEM HAVING AN ELECTRIC FIELD SHIELD

BACKGROUND OF THE INVENTION

The invention relates to a noncontacting displacement measuring system, comprising a sensor with a measuring side and a connection side, an electronic supply/evaluation unit, and a cable leading from the sensor to the electronic supply/evaluation unit and having preferably two inner conductors, with the sensor comprising a housing, at least one coil arranged in the housing, connecting lines leading from the inner conductors of the cable to the coil or respectively coils, and, if need be, an embedding substance which anchors the coil or respectively coils and the connection lines.

For years, noncontacting displacement measuring systems of different types have been known from the practice. They can be classified by their basic mode of operation, first, into displacement measuring systems on the basis of eddy currents, and inductive and capacitative displacement measuring systems, and, second, into optical or acoustical displacement measuring systems.

The present invention relates to a noncontacting displacement measuring system comprising a sensor with at least one coil, i.e., displacement measuring systems, which operate either on eddy-current basis or by induction.

In displacement measuring systems operating by the eddy-current measuring method, a high-frequency alternating current flows through a coil normally cast into a housing, which forms an oscillating circuit by the parallel connection of capacitances. In this process, an electromagnetic field emanates from the coil. This field induces eddy currents in a conductive object, which withdraw energy from the oscillating circuit. Primarily at higher operating frequencies, a reaction of the induced eddy currents appears, which changes as a back induction the real part of the impedance of the coil. The influence on the imaginary part of the coil impedance is, in this process, dependent on the magnetic characteristics and the operating frequency. Nonmagnetic objects of measurement reduce the inductance of the coil when approaching the latter.

The amplitude of the oscillating circuit changes as a function of the spacing. Demodulated, linearized, and amplified, if need be, the change in amplitude supplies a voltage which varies proportionally to the spacing between the sensor and the object of measurement.

In the case of the inductive measuring method, the coil arranged in the sensor is likewise a part of an oscillating circuit. When a conductive object of measurement is approached, the imaginary part of the coil impedance will change primarily. This applies mainly to low operating frequencies, i.e, operating frequencies of up to several 100 kHz. Magnetic objects increase the inductance as they approach the coil, nonmagnetic objects lessen it. Also here, a demodulated output signal is proportional to the distance between the sensor and the object of measurement.

Both in the case of the eddy-current measuring method and in the inductive measuring method, the change in the impedance of a measuring coil arranged in a sensor is measured, when an electrically and/or magnetically conductive object of measurement is approached. The measuring signal thus corresponds to the distance of measurement.

The change in impedance which is create by varying the spacing between the sensor and the object to be measured, thus, results on the one hand from a change in inductance of the coil, and on the other hand from the change in real resistance of the coil. The imaginary part of the coil impedance is thus predetermined, among other things, by the self-capacitance of the measuring coil and, thus, by the entire configuration of the sensor. The electric field lines exiting from the sensor during a measurement, are accordingly also decisive for the self-capacitance of the sensor. When an electrically conductive object of measurement approaches the sensor, the electric field emanating from the sensor is thereby also influenced. This applies likewise, when an object with a relatively high dielectric constant approaches. Consequently, a substance with a high dielectric constant located between the sensor and the actual object of measurement causes a change in the self-capacitance and thus in the total capacitance of the measuring coil.

For example, when water ($\epsilon r \approx 80$) enters between the sensor and the object of measurement, the self-capacitance of the measuring coil will be influenced. In the case of conventional sensors, the change in capacitance amounts to few pF. Should water or another substance with a high dielectric constant be continuously present, it will be possible to consider the influence of the water on the self- capacitance of the coil when calibrating the measuring system. However, if the space between the sensor and the object of measurement is, for example, not splash-proof, that is, should water enter uncontrolled and only temporarily into the range of measurement, errors in the distance measurement will occur, which increase along with the distance between the sensor and the object of measurement. The reason for this is that a movement of the object of measurement effects only a slight change in impedance of the coil at a great distance between the sensor and the object of measurement.

The operating frequency or respectively resonant frequency is calculated with the known formula $$f(Res) = \frac{1}{2 \cdot \sqrt{L \cdot (C_{Spule} + C_{Erg})}}$$

wherein $C_{Spule}$ is the self-capacitance of the sensor coil and $C_{Erg}$ the supplemental capacitance for the desired operating frequency.

At low frequencies and a given inductance L, the percentage change of the resonant frequency is only slight, since the capacitance $C_{Erg}$ is substantially greater than the self-capacitance of the coil. The percentage change of the resonant frequency, however, increases quadratically with the frequency, since $C_{Erg}$ decreases correspondingly. This means that the influence at 1 MHz is 100 times as great as at 100 kHz.

It is therefore the object of the invention to provide for a noncontacting displacement measuring system, in which the influence of fluids or solids with a high dielectric constant on the measured values is largely eliminated.

The noncontacting displacement measuring system according to the invention solves the aforesaid problem in that a shield is provided on the measuring side of the sensor, and that on the one hand the shield is at least largely impervious to electric field lines emanating from the coil or coils, and on the other hand at least largely permeable to electromagnetic field lines emanating from the coil or coils.

According to the invention it has been recognized that the influence of fluids or solids with a high dielectric constant located in the range of measurement on the measured values can be eliminated, when the electric field lines which normally emanate from the sensor, are shielded toward the outside, i.e., when the electric field is closed all around. The material which is used to shield the electric field, should not influence or only slightly influence the electromagnetic field necessary for the measurement.

There are various possibilities of advantageously expanding and further developing the teaching of the present invention. In conjunction with the description of the preferred embodiment of the invention with reference to the drawing, also generally preferred embodiments and further developments of the teaching will be described. Illustrated in the drawing is in FIG. 1 a schematic view of the measuring principle which underlies the noncontacting displacement measurement as in the prior art;

Figure 1:
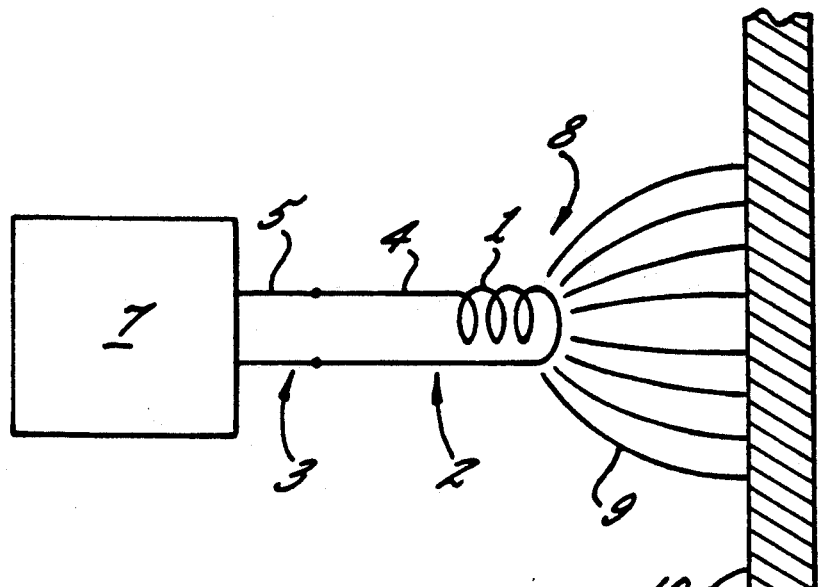

FIG. 1 illustrates the known measuring principle underlying the noncontacting displacement measurement both in accordance with the eddy-current measuring method and in accordance with the inductive measuring method. A sensor 2 which is only represented by a coil 1 for the sake of simplicity, is connected on its connection side 3 with its connection lines 4, via inner conductors 5 of a cable 6, to an electronic supply/evaluation unit 7. From the coil 1 or respectively sensor 2, an electromagnetic field extends, or respectively electromagnetic field lines 9 extend to an object of measurement 10 and are closed there. In the case of an electrically conducting object of measurement 10, eddy currents are induced in the object of measurement 10, on the one hand, and the inductance of the coil 1 changes, on the other. When the objects of measurements 10 are ferritic, a change in inductance of the coil 1 will occur.

Figure 2:
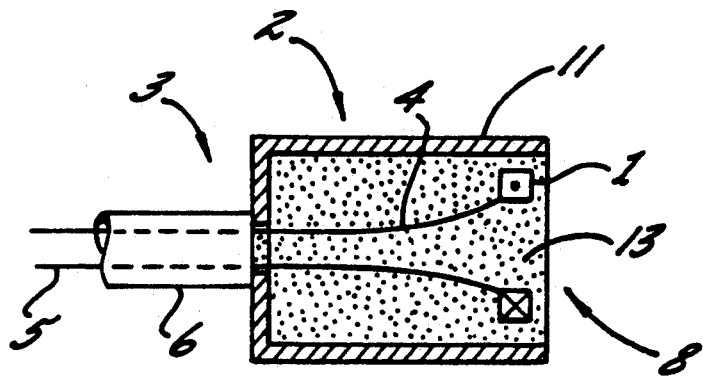
FIG. 2 is a schematic view of a typical sensor which operates according to the measuring principle of FIG. 1 as in the prior art.

Illustrated in FIG. 2 is the basic setup of a known noncontacting sensor 2 which operates by the eddy-current measuring method or the inductive measuring method. The sensor 2 comprises essentially a housing 11, the coil 1 accommodated therein, the connecting lines 4 leading to the cable 6 or respectively to the inner conductors 5 of the cable 6, and an embedding substance 13 for anchoring the coil 1 inside the sensor housing 11 The cable 6 leading to the electronic supply/evaluation unit 7 which is not shown in FIG. 2, is preferably shielded against electric and electromagnetic fields, and is preferably a coaxial cable.

Figure 3:
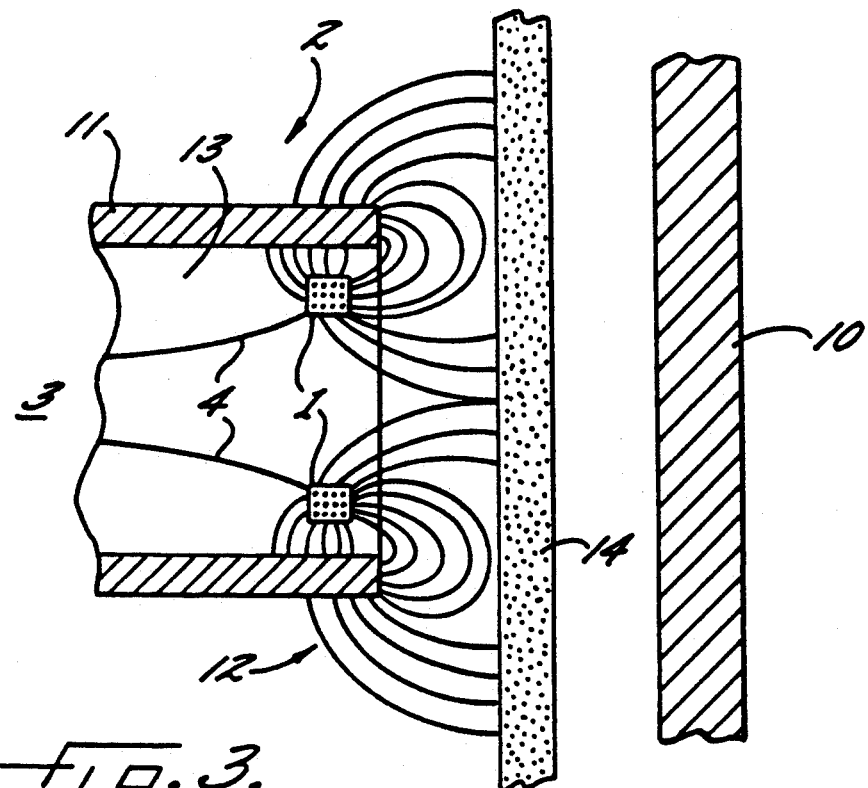
FIG. 3 is an enlarged and fragmentary schematic view of the sensor of FIG. 2 and the pattern of the electric field lines emanating from the sensor as the prior art.

In operation of the sensor illustrated in FIG. 2 and known from the practice, both the electromagnetic and electric field lines necessary for the displacement measurement exit outwardly in direction of the object of measurement. FIG. 3 shows clearly the influence of an object 14 with a relatively high dielectric constant εr located in the measuring range between the sensor 2 and the actual object of measurement 10. The influence of the electric field lines 12 resulting therefrom entails a change in the self-capacitance of the coil 1.

Figure 4:
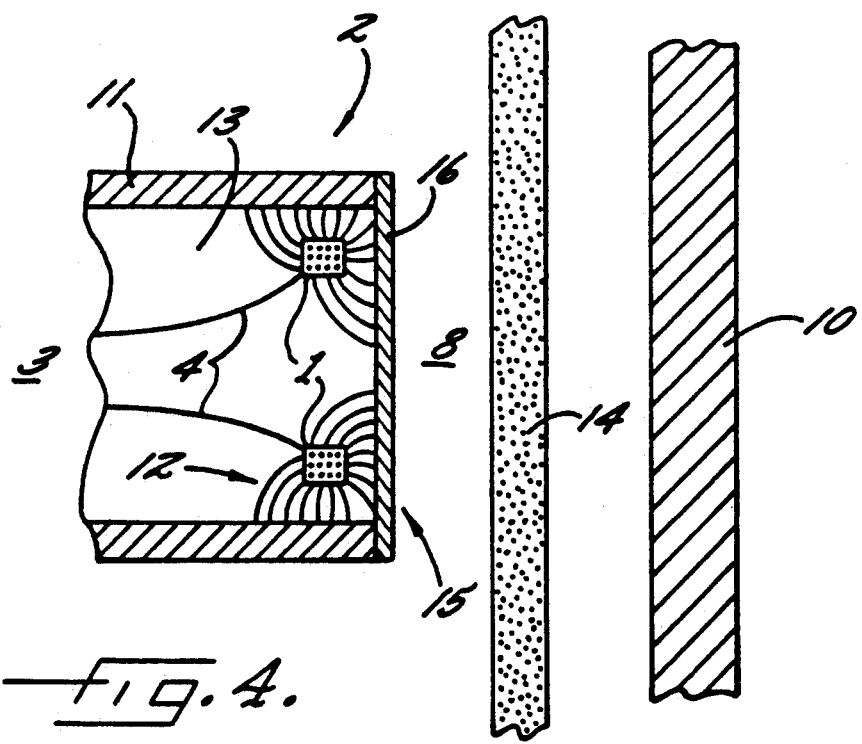
FIG. 4 is a schematic view of a sensor with a shield in accordance with the noncontacting displacement system of the present invention.

FIG. 4 is a fragmentary view of the sensor 2 of a noncontacting displacement measuring system in accordance with the invention. As shown in FIGS. 1 and 2, such a displacement measuring system comprises substantially the sensor 2 having a measuring side 8 and a connection side 3, an electronic supply/evaluation unit 7, and the cable 6 with two inner conductors 5 leading from the sensor 2 to the electronic supply/evaluation unit. For the sake of simplicity, the illustration in FIG. 4 shows only the measuring side 8 of the sensor 2.

The sensor 2 includes the housing 11, the coil 1 arranged in the sensor housing 11, two connecting lines 4 leading from the two inner conductors 5 of the cable 6 to the coil 1, and the embedding substance 13 for anchoring the coil 1 and the connection lines 4. A further coil, for example, a reference coil for temperature compensation, could be arranged inside the sensor housing. Likewise, it would be possible to accommodate in the sensor housing several coils which operate as measuring coils.

With regard to the embedding substance, it should be pointed out that the material used for this purpose is to be selected in dependence on the field conditions of the sensor, such as use under high temperatures, under considerable pressure fluctuations, in a detrimental atmosphere, etc.

FIG. 4 shows clearly that a shield 15 is provided on the measuring side 8 of the sensor 2. This shield 15 is largely impervious to the electric field lines 12 emanating from the coil 1, on the one hand, and on the other hand largely permeable to electromagnetic field lines emanating from the coil 1 and not shown in FIG. 4.

In a preferred embodiment of the noncontacting displacement measuring system of the present invention, the aforesaid shield could be arranged directly on the coil. In so doing, it would be particularly advantageous to construct the shield for the electric field lines as an enclosure of the coil. For example, the shield could enclose the coil, in a simple manner from the manufacturing viewpoint, as a coat of varnish. Likewise, it would be conceivable to vapor-deposit the shield onto the coil, whereby it would be possible to produce especially thin layers. Such a formation of the shield would have the advantage that the shield would be protected by the embedding substance, together with the coil inside the housing.

According to the embodiment illustrated in FIG. 4, the shield 15 is designed as a cover 16 which is arranged on the measuring side 8 of the sensor 2. The cover 16 closes simultaneously the sensor housing 11 on the measuring side and could, therefore, also serve to protect the coil 1 or the embedding substance 13 against aggressive media, temperature, or pressures.

The cover could be attached to the sensor in different ways. For example, it would be possible to slip the cover in a constructionally simple manner onto the sensor housing on the measuring side. Likewise, a screw-type mount of the cover on the sensor housing would be conceivable. The foregoing possibilities of mounting the cover would be advantageous inasmuch as the cover could be exchanged easily, if need arises, for example in the event of damage.

Likewise, it would be conceivable to connect the cover adhesively to the sensor housing or respectively the embedding substance, for example by bonding. Finally, it would also be possible to connect the cover integrally with the material of the sensor housing. Contrary to the above-described removable cover, the cover fixedly joined to the sensor housing forms an effective seal of the sensor housing, which is particularly advantageous when the sensor is used in a detrimental atmosphere.

The following will discuss the materials to be considered for shielding the electric field lines which emanate from the sensor. For example, a suitable shielding of the electrical field can be accomplished by an electrically conductive material. However, to avoid that the electromagnetic field necessary for the measurement is not shielded at the same time, it is necessary to provide such a shield in a thin layer. Accordingly, the shield could also consist of a conductive plastic or of graphite. Important for a shielding of the electric field emanating from the sensor by means of electrically conductive material, however, is the fact that the shield must be made in a thin layer, and that in accordance with the depth of penetration of the electromagnetic field, the latter is damped only to an insignificant extent.

However, when in a particularly advantageous manner the shield is made of ceramic, only very little or even no damping problems will arise with respect to the electromagnetic field. With a ceramic shield, such as is used, for example, in multilayer capacitors, i.e., in the case of a shield having a dielectric constant $\epsilon r \geq 1000$, practically no damping of the electromagnetic field will occur, whereas the electric field is however largely shielded.

In conclusion, it should be pointed out that the gist of the present invention—the shielding of the electric field and the passage of the electromagnetic field of a noncontacting sensor—can be realized in all hitherto known displacement measuring systems operating by the eddy-current measuring method or by the inductive measuring method.

That which is claimed is:

1. A noncontacting displacement measuring system comprising:
   a sensor with a measuring side and a connection side;
   an electronic supply/evaluation units;
   a cable having two inner conductors and leading from said sensor to said electronic supply/evaluation unit;
   said sensor comprising a housing, at least one coil, and an embedding substance for anchoring said at least one coil and said inner conductors from said cable within said housing; and
   a shield positioned adjacent the measuring side of said sensor, said shield having a predetermined thickness and comprising a material so that said shield is both substantially impervious to electric field lines emanating from said at least one coil and substantially permeable to electromagnetic field lines emanating from said at least one coil;
   said electronic supply/evaluation unit including means cooperating with said sensor for operating based upon one of an eddy-current basis and an induction basis;
   whereby said shield substantially eliminates an influence on a measurement caused by a contaminating material having a high dielectric constant temporarily interposed between said sensor and an object being measured.

2. A displacement measuring system according to claim 1 wherein said shield is arranged directly on said at least one coil.

3. A displacement measuring system according to claim 1 wherein said shield is constructed as an enclosure of said at least one coil.

4. A displacement measuring system according to claim 1 wherein said shield is vapor-deposited onto said at least one coil.

5. A displacement measuring system according to claim 1 wherein said shield is constructed as a cover provided on the measuring side of said sensor.

6. A displacement measuring system according to claim 5 wherein said cover closes said sensor housing on the measuring side thereof.

7. A displacement measuring system according to claim 5 wherein said cover is adhesively joined to said sensor housing.

8. A displacement measuring system according to claim 5 wherein said cover is adhesively joined to said embedding substance of said sensor.

9. A displacement measuring system according to claim 1 wherein said shield is a thin layer and comprises an electrically conductive material.

10. A displacement measuring system according to claim 9 wherein said shield comprises a conductive plastic.

11. A displacement measuring system according to claim 9 wherein said shield comprises graphite.

12. A displacement measuring system according to claim 1 wherein said shield comprises ceramic.

13. A displacement measuring system according to claim 12 wherein said shield has a relative dielectric constant $\epsilon_r \geq 1000$.

* * * * *